(12) United States Patent
Jefferson et al.

(10) Patent No.: US 8,142,874 B1
(45) Date of Patent: Mar. 27, 2012

(54) BI-MATERIAL COMPOSITE STRUCTURE WITH REDUCED THERMAL EXPANSION

(75) Inventors: George Jefferson, Bellbrook, OH (US); Ronald J. Kerans, Yellow Springs, OH (US); Triplicane A. Parthasarathy, Beavercreek, OH (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 541 days.

(21) Appl. No.: 12/393,405

(22) Filed: Feb. 26, 2009

(51) Int. Cl.
*B32B 3/12* (2006.01)

(52) U.S. Cl. ......... 428/116; 428/117; 428/118; 428/593

(58) Field of Classification Search .................. 428/116, 428/117, 118, 593
See application file for complete search history.

(56) References Cited

U.S. PATENT DOCUMENTS

| | | | |
|---|---|---|---|
| 5,322,559 A | 6/1994 | Sleight | |
| 5,488,018 A | 1/1996 | Limaye | |
| 5,919,720 A | 7/1999 | Sleight et al. | |
| 6,258,743 B1 | 7/2001 | Fleming et al. | |
| 6,582,826 B1 | 6/2003 | Goto et al. | |
| 6,844,283 B2 | 1/2005 | Kuwata et al. | |
| 7,049,257 B2 | 5/2006 | Omote et al. | |
| 7,115,317 B2* | 10/2006 | Zhuo et al. ................... | 428/116 |
| 7,279,230 B1 | 10/2007 | Kerans et al. | |
| 7,485,593 B2 | 2/2009 | Ezaki et al. | |
| 7,655,195 B1* | 2/2010 | Ichikawa et al. .............. | 422/180 |
| 2008/0233347 A1* | 9/2008 | Chefdeville et al. .......... | 428/116 |

OTHER PUBLICATIONS

B.C. Chen et al., "Advances in Computational Design and Optimization with Application to MEMS", International Journal for Numerical Methods in Engineering, 2001, pp. 23-62, vol. 52(1-2).
R. Lakes, "Cellular Solid Structures with Unbounded Thermal Expansion", Journal of Materials Science Letters, 1996, pp. 475-477, vol. 15.
R. Lakes, "Solids with Tunable Positive or Negative Thermal Expansion of Unbounded Magnitude", Applied Physics Letters, 2007, 221905, vol. 90.
H.U. Schuerch, "Thermally Stable Macro-Composite Structures", 1972, NASA contractor report CR-1973.
C.A. Steeves et al., "Concepts for Structurally Robust Materials that Combine Low Thermal Expansion with High Stiffness", Journal of the Mechanics and Physics of Solids, 2007, pp. 1803-1822, vol. 55.

* cited by examiner

*Primary Examiner* — Jennifer McNeil
*Assistant Examiner* — Clarisa M Carrizales
(74) *Attorney, Agent, or Firm* — AFMCLO/JAZ; Charles Figer

(57) ABSTRACT

A planar two material structure comprising a first material having a coefficient of thermal expansion greater than zero and a second material having a second coefficient of thermal expansion greater than zero. The two materials structurally combined in a plurality of repetitive for or six sided unit cells having a combined coefficient of thermal expansion less than the coefficient of thermal expansion of either material alone.

14 Claims, 12 Drawing Sheets

Example geometry for a planar thermally stable structure

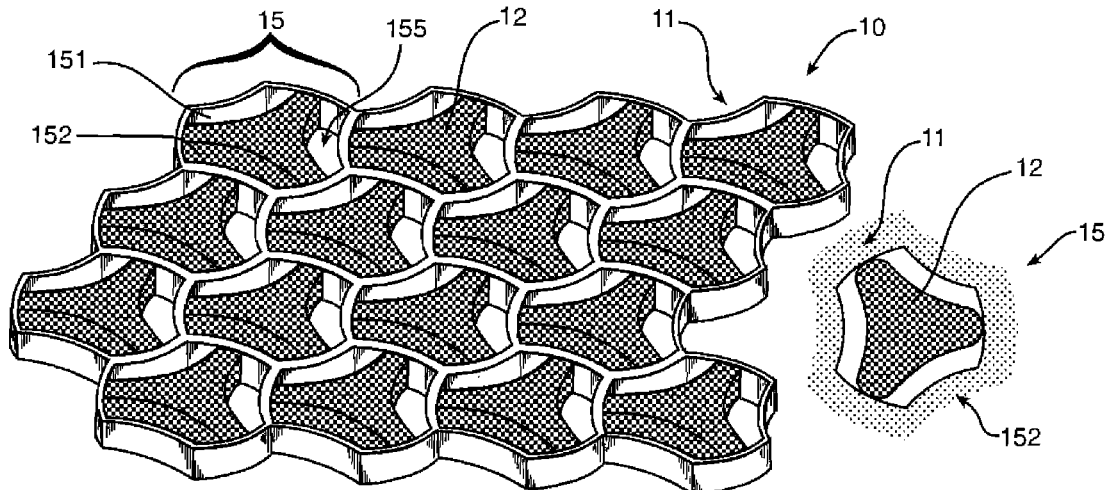
Fig. 1 Example geometry for a planar thermally stable structure
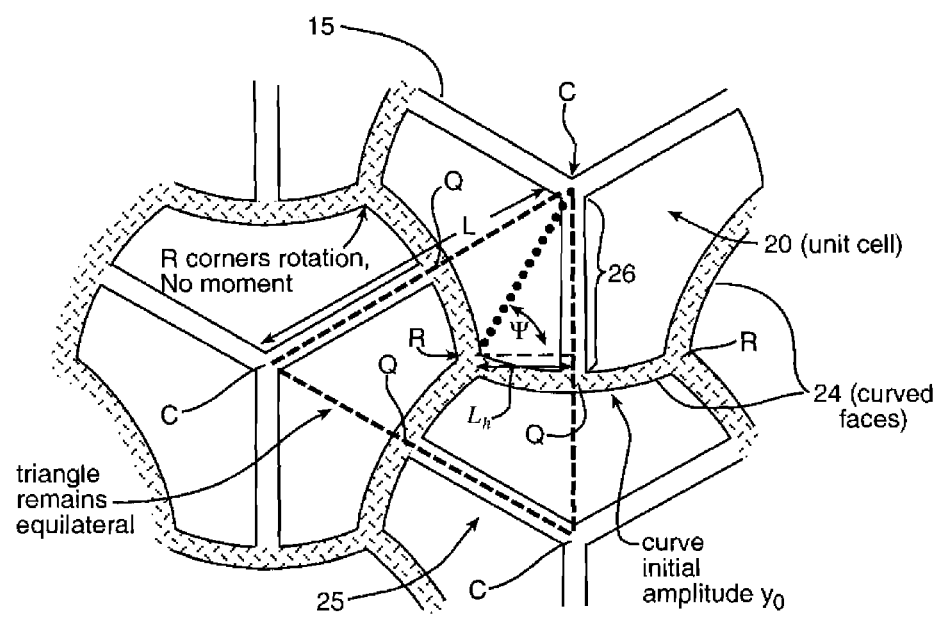
Fig. 2 Unit cell geometry for analysis of the thermally stable structure

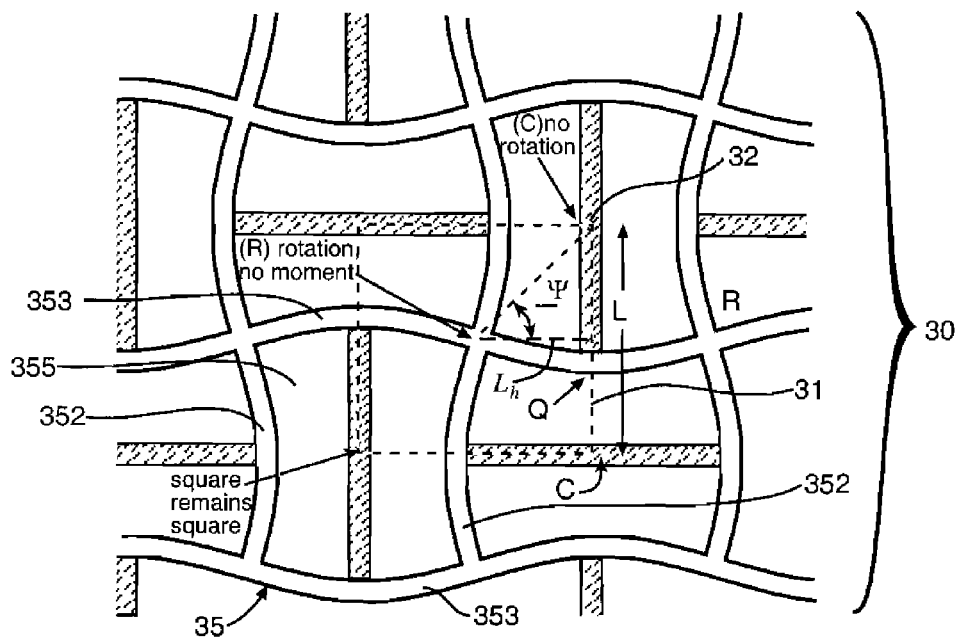
Fig. 3 Schematic representation of a square grid thermally stable structure.
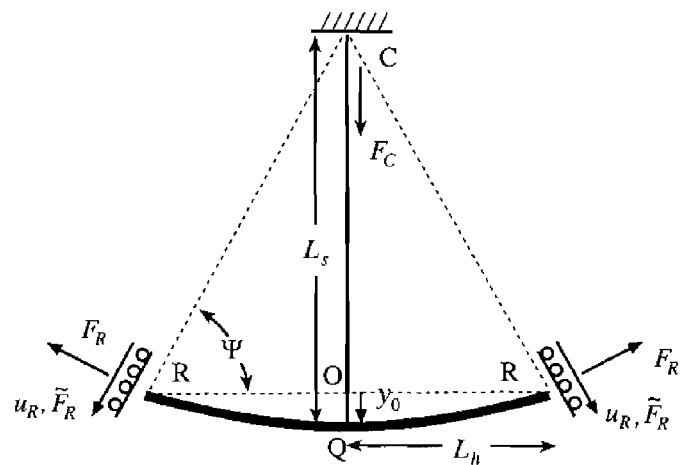
Fig. 4 Unit cell used for analysis, with periodic boundary condition shown.

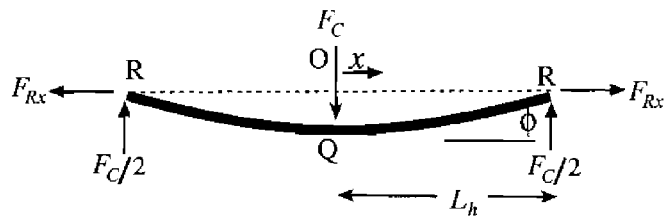
Fig. 5 Schematic representation of curved beam
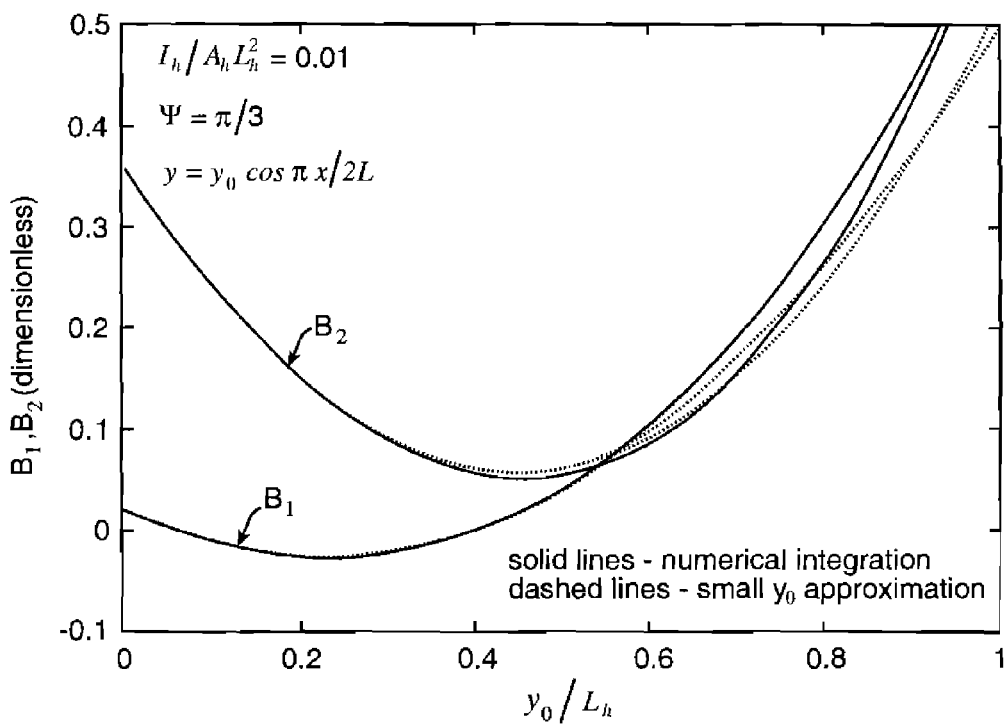
Fig. 6 all free edges (no periodicity conditions)

US 8,142,874 B1

BI-MATERIAL COMPOSITE STRUCTURE WITH REDUCED THERMAL EXPANSION

RIGHTS OF THE GOVERNMENT

The invention described herein may be manufactured and used by or for the Government of the United States for all governmental purposes without the payment of any royalty.

BACKGROUND OF THE INVENTION

The invention relates to the design of structures with near zero thermal expansion or other design-specific thermal shape change characteristics using materials which, although desirable for other reasons, would not be acceptable with conventional single-material structural design because their intrinsic thermal expansivity doesn't match the design criteria.

In the design of most engineering structures which are subject to significant temperature excursions, the thermal expansion behavior of the structure is of key importance. The constituent material's coefficient of thermal expansion (CTE) is one of the driving material properties considered in the engineering materials selection process. The importance of the thermal expansion stems from several basic types of design requirements. In applications, such as supports for space-based mirrors, the dimensional stability is a key consideration. That is, ideally the structure should exhibit very little dimensional change when subjected to substantial changes in temperature that occur as the structure is exposed to changing environmental radiation conditions. Prior attempts to design stable structures for this type application resulted in only one-dimensional thermal stability and required complex pin-jointed designs. Another class of design challenge arises in structures subjected to space-varying thermal gradients, such as engine components subjected to hot combustion environment or hypersonic airframe surfaces subjected to aerothermal heating. The resulting gradient in thermal strain can result in design-limiting thermally induced stressing. In such cases, stresses may be reduced by specifically varying the material's CTE for compatibility with the thermal gradient.

The 'menu' of intrinsic CTE's available with structural engineering materials is however quite limited, and in most cases, available materials with the ideal expansivity for an application are less than ideal for other reasons. For example, intrinsically low expansion glasses currently used for space mirror supports are inferior to ceramic composites in terms of weight, fabricability and ultimate temperature capability. As another example, ultra high temperature ceramics (UHTC's) appear to be ideally suited to hypersonic leading edge applications, however their expansivity is too large for compatibility with the much cooler support structure. It is therefore desirable to design composite structures with effective expansivities that are substantially different from that of the constituent materials.

The possibility of controlling the thermal expansion will allow great design flexibility, and is the basis of this work. The manner in which thermal expansion influences design varies with the specific application. A few current applications of high technological interest are outlined below, before presenting an exploration of possible solutions for tailored structures.

An example of one approach is shown in Schuerch, H. U. Thermally stable macro-composite structures, NASA Contractor report CR-1973, February 1972 and incorporated herein by reference. Another approach is discussed in Steeves, C. A., dos Santos e Lucato, S. L. He, M. Antinucci, E., Hutchinson, J. W. and Evans, A. G. Concepts for structurally robust materials that combine low thermal expansion with high stiffness *Journal of the Mechanics and Physics of Solids* 55, 1803-1822 (2007) also incorporated herein by reference. Both have devised an isotropic pin-joint approach.

Another class of design challenge arises in structures subjected to space-varying thermal gradients, such as engine components subjected to hot combustion environment or hypersonic airframe surfaces subjected to aerothermal heating. The resulting gradient in thermal strain can result in design-limiting thermally induced stressing. In such cases, stresses may be reduced by specifically varying the material's CTE for compatibility with the thermal gradient. Additionally, structures which are specifically designed to undergo significant thermally-driven shape change may be utilized as actuators or actively deforming aero structures.

With these motivations, a composite material/structural design concept was explored to determine the merits and limitations of such concepts. In particular, the possibility of devising structure that allows fabrication of structures with tailored or designed-in CTE values is examined. Analytical expressions are derived that will enable designing with these structures practical. The derivations may be verified using finite element methods.

SUMMARY OF THE INVENTION

The invention relates to the possibility of using flexural rotation of one component accommodating the expansion of the other component, along with its own.

A planar two material structure comprising a first material having a coefficient of thermal expansion greater than 0 and a second material having a second coefficient of thermal expansion greater than 0. In one embodiment the two materials structurally combined in a plurality of repetitive four or six sided cells. Where the structure is equilateral triangles having three sides of equal length and three equal included angles, each triangle may have about 0.0 degrees rotation at the angles. In one embodiment the coefficient of thermal expansion for the first material is different than the coefficient of thermal expansion for the second material and the coefficient of thermal expansion for the structure is less than the coefficient of thermal expansion of the first material and the coefficient of thermal expansion for the second material.

Nomenclature used in the application includes:
L periodic structure characteristic length
$\Psi$ internal angle
R,C,Q position identifiers in periodic structure
$\Delta T$ uniform temperature change
subscripts: s,h constituent values, s—'strut', h—'honeycomb'.
$\alpha_s, \alpha_h$ thermal expansion coefficient
$E_s, E_h$ elastic modulus
$\rho_s, \rho_h$ mass density
$A_s, A_h$ cross section area
$I_h$ section moment of inertia
$t_s, t_h$ in plane thickness for extruded design
Z extrusion depth
$L_h, L_s$ component length
$L^*_h$ curved face arc length
y(x) shape of curved face
$y_0$ amplitude of y(x)
$F_c$ force in strut at point C
$F_R, \tilde{F}_R$ reaction force in honeycomb at point R, normal and parallel to line R-C.
$F_{Rx}, F_{Ry}$ forces resolved in directions R-R and Q-C.

N, M force and bending moment in curved face $U$, $U_s$, $U_h$ complementary thermoelastic strain energy per unit cell, total and component values.

$A_1$, $A_2$, $A_3$, $B_1$, $B_2$ constants appearing in energy expressions $u_R$ displacement of point R relative to C in direction R-C.

$\epsilon_t$ effective thermal strain $\bar{\alpha}$ effective thermal expansion $\Theta$ normalized effective CTE.

$\sigma$, $\sigma_{max}$ stress in curved face, max value.

$\xi$ thickness coordinate in curved face

BRIEF DESCRIPTION OF THE DRAWINGS

FIG. 1 is an illustrative example of a planar thermally stable structure.

FIG. 2 is an illustrative example of a hexagonal unit cell geometry of a planar thermally stable structure.

FIG. 3 is an illustrative example of a four-sided unit cell geometry of a planar thermally stable structure.

FIG. 4 is a visual illustration of the applied mathematical model for the calculations.

FIG. 5 is a visual illustration of the curved beam mathematical model for the calculations.

FIG. 6 is a graphical comparison of dimensionless constants, $B_1$ and $B_2$.

DETAILED DESCRIPTION

Figure 7:
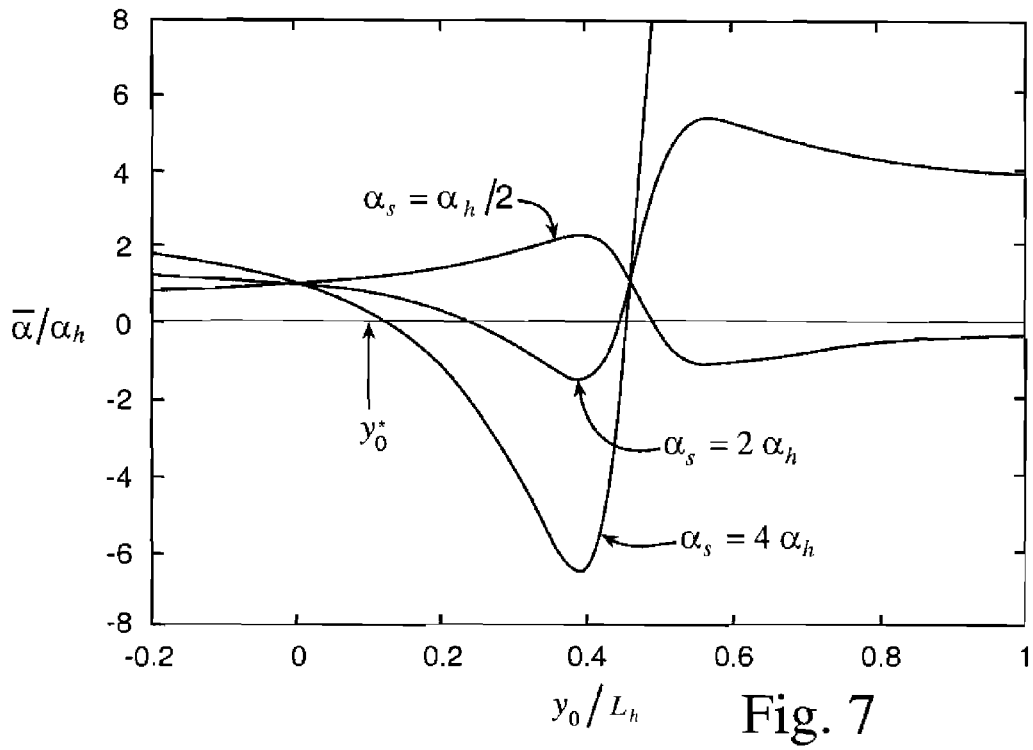
FIG. 7 is a graphical representation of the effective expansion of a tailorable hexagonal grid structure such as that shown in FIG. 2.

An example of a thermal structure 10 is shown in FIG. 1. A continuous honeycomb structure 11 is fabricated of one material. The material may have a coefficient of thermal expansion greater than 0.0. The honeycomb structure 11 includes a plurality of cells 15, which have cell sides 151 forming a cell opening 155. The cells 15 also have a top surface 152. An insert 12 made of preferably a second material with preferably a different Coefficient of thermal expansion (CTE) also greater than 0.0 is inserted in the cell opening 155 or formed as part of each cell 15. Preferably the CTE of the insert 12 material is greater than the CTE of the honeycomb structure 11 material. The inserts 12 may be permanently bonded or simply press-fit, therefore allowing flexibility to design with a wide variety of constituents. The inserts may be flush with the top surface 152, below the top surface 152 or in alternate embodiments extend above the cell top surface 152. In alternate embodiments the insert may extend across at least a portion of the cell top surface. The insert may also overlap a portion of other adjacent inserts.

As the structure undergoes a temperature increase, the inserts 12 expand more-so than the honeycomb 11 and thus puts the cell side 151 into bending. This results in a shortening of a distance $2L_h$ between two corners of rotation R as shown in FIG. 2 The bending effectively cancels the overall expansion so that, with appropriate specification of the materials and geometry, a zero, or other design target, effective thermal expansion results. The expansion (zero or otherwise) is notably isotropic in the plane of the honeycomb structure 11. Preferably the coefficient of thermal expansion of the structure is less than the first material coefficient of thermal expansion and less than the second material coefficient of thermal expansion.

There is no intrinsic length scale to the model. This concept could be in principle implemented on a micro-scale in a manner similar, or it could represent a large scale truss-like structure. Further, the design may be a two dimensional extrusion or alternatively a three-dimensional structure.

A key to the usefulness of the design is the availability of an accurate model for the behavior that allows the designer to (a) identify and (b) specify the relevant geometric parameters. The model is based in part upon analytically tractable elements, and leads to a direct method of calculation of effective thermal expansivity. This analytic result may be desirable both for rapid design adjustment as well as convenient for development of relatively simple fabrication routes.

The tailorable design is modeled by idealizing the structure as a large or infinite periodic array consisting of two-dimensional beam-like components, and analyzing the response of a triangular unit cell 20, as shown in FIG. 2. Some elements of FIG. 2 are alphabetically rather than numerically identified for use in subsequent analytical equations.

FIG. 2 shows the hexagonal design in a stress-free (ambient temperature) configuration. A centroid C of each hexagonal cell is located in the center of the cell 15. An intersection R denotes the corners joining curved faces 24. A curved face center Q identifies the bisecting center the curved face 24. The straight sections, Q-C, are of one thermo-elastic material and the curved sections R-Q-R are of a second material, which in general may have different thermal expansion as well as elastic properties. For simplicity of analysis the materials properties may be assumed to be isotropic, although the extension to anisotropic materials is straightforward so long as the anisotropy does not alter the symmetry of the structure.

The analysis begins with a characterization of the aspects of the deformation that are a consequence of the periodic symmetry. An equilateral triangle 25 with a side L is shown in FIG. 2. Under thermal expansion, the equilateral triangle 25 will remain an equilateral triangle. Segments Q-C between the curved face center Q and the centroid C remain straight, that is they are designed to be pure tensile elements or struts, with associated quantities given a subscript s, i.e. the strut material CTE and strut elastic modulus are denoted $\alpha_s$ and $E_s$ respectively.

Intersection R remains at the centroid C of the triangle, hence the angle denoted $\Psi$ is fixed with the value $\Psi=\pi/3$. The R-Q-R segments form a continuous honeycomb-like grid (with curved faces), hence the relevant material parameters will be denoted with subscript h. The specific shape of the curved section is a design variable to be specified in order to achieve the desired thermal expansion behavior.

Due to symmetry, the effective thermal expansion of the periodic structure will be isotropic, and can be calculated from the relative motion of periodically equivalent points. For example the thermal strain may be calculated as $\epsilon_t = \Delta \overline{CC}/\overline{CC}$, where the overbar indicates the length of the segment and $\Delta$ denotes a change in length. Because R is the triangle centroid, we may also, more conveniently, calculate the thermal strain as $\epsilon_t = \Delta \overline{RC}/\overline{RC}$. The strain $\epsilon_t$, so defined, may be an overall, effective, or average thermal strain. Points R and C move as if embedded in a continuum which undergoes a uniform plane dilatational strain $\epsilon_t$. The material at a point R rotates, however, as the structure deforms, while the material at point C does not. All other points in the structure follow a more complex motion, and are preferably free to do so.

A related square-grid tailored CTE structure 30 is shown schematically in FIG. 3 where like elements have been given like identifiers. The structure 30 includes a concave side 352 and a convex side 353, four of which form a rectangle unit cell 35 with a cell opening 355. Four rectangle unit cells 35 form a honeycomb/lattice. For the lattice, a dashed square 31 identified on FIG. 3 remains square. An intersection R denotes the corners joining four sides. Points R are fixed at the center of the dashed square 31. A curved face center Q identifies the bisecting center of the convex side 353 as shown in FIG. 3 (it could also be the bisecting center of the concave side 352 depending upon the defined orientation for analysis). An insert 32 of a second material extends between the two convex sides 353 of the cell 35. A centroid C is located at the center of a plurality of rectangle cells 35, which make up the tailored CTE structure 30. The dashed square 30 extends from the centroid C of one cell to the centroid C of another cell. The distance between centroids is L. The remainder of the analysis to obtain a structure with reduced thermal expansion is the same for both square and hexagonal configurations, except that in the square case $\Psi=\pi/4$.

For convenience of calculation the representative unit cell is mathematically modeled in FIG. 4. Point C is taken as the origin, which is regarded as fixed. Points R are constrained to slide along the directions defined by $\Psi$ with displacement magnitude $u_R$ as shown. Symmetry requires that there are no bending moments at R or C and that the reaction force at C, $F_C$, is directed along QC and the reaction force at R is normal to the line RC. The reaction at R is however assumed to have the normal component, $F_R$, and a tangential component $\tilde{F}_R$. The tangential force $\tilde{F}_R$ must be zero if the thermal expansion of the structure is unconstrained. It is retained here because we will ultimately determine $u_R$ by a virtual work method.

Denoting the length $\overline{CC}$ (FIGS. 2 & 3) as the fundamental unit length of the structure, L, the undeformed dimensions of the unit cell are:

$$\overline{RC} = L/(2 \sin \Psi)$$

$$\overline{OR} = L/(2 \tan \Psi)$$

$$\overline{OC} = L/2 \quad (1)$$

Where O is the intersection point of straight line segments R-R and Q-C. The curve R-Q-R has an amplitude, $y_0$, measured from R-O-R. The length of the strut portion of the cell is then $L_s = L/2 + y_0$. The secant half-length of the curved face $\overline{OR}$ is denoted $L_h$, so that $L_s = L_h \tan \Psi + y_0$.

The shape of the curve, which is a design parameter, is given by the even valued function $y(x)$ with x the distance along O-R, which must satisfy $y(L_h)=0$ and $y(0)=y_0$. The form of $y(x)$ may be selected, for example, $$y = y_0 \cos \frac{\pi}{2} \frac{x}{L_h} \quad (2)$$

or $$y = y_0 (1 - (x/L_h)^2) \quad (3)$$

As will be shown the specific shape is of minor significance.

The forces, $F_R$, $F_C$ and displacement $u_R$ are then determined following a straightforward energy analysis. Since the strut is a simple tensile element the thermoelastic complementary strain energy is, $$U_s = \frac{1}{2} \frac{F_C^2 L_s}{E_s A_s} - \alpha_s L_s \Delta T F_C \quad (4)$$

where $A_s$ is the cross-section area and $\Delta T$ is a uniform temperature change.

FIG. 5 shows a schematic of the curved element. The x-y coordinate components of the reaction forces are, $$F_{Ry} = F_R \cos \Psi - \tilde{F}_R \sin \Psi$$

$$F_{Rx} = F_R \sin \Psi + \tilde{F}_R \cos \Psi \quad (5)$$

Noting for equilibrium, $F_{Ry} = F_C/2$, the x-force is determined from Eq. (5) as, $$F_{Rx} = \frac{1}{2} F_C \tan \Psi + \tilde{F}_R / \cos \Psi \quad (6)$$

The deformation of the curved segment is calculated following the analysis of a structural arch.

The bending moment, M and normal stress N in the curved segment at a point located a distance x from the center are, $$|M| = \frac{F_C}{2}(L_h - |x|) - F_{Rx} y \quad (7)$$

$$N = F_{Rx} \cos \phi + \frac{F_C}{2} \sin \phi \quad (8)$$

where $\phi$ is the angle between the curve and the line R-R. The normal force expression is a small $\phi$ approximation, and shear stressing is neglected following Timoshenko.

The complementary strain energy, $U_h$ in the curved element is, $$U_h = \frac{1}{2}\int_S \frac{M^2}{E_h I_h} + \frac{N^2}{E_h A_h} + 2N\alpha_h \Delta T \, ds \quad (9)$$

where $I_h$ is the moment of inertia of the beam section. The integral is evaluated over the arc length of the beam S. Combining Eqn's (6-9).

$$U_h = \qquad (10)$$
$$\frac{L_h^3}{E_h I_h}\left(\frac{\tilde{F}_R^2}{\cos^2\Psi}A_{22} + \frac{F_C \tilde{F}_R}{\cos\Psi}B_1 + \frac{1}{4}B_2 \tilde{F}_C^2\right) + \left(\frac{2L_h}{\cos\Psi}\tilde{F}_R + L_s F_C\right)\alpha_h \Delta T$$

where the strut length $L_s$ has appeared by substitution for the quantity $L_h \tan\Psi + y_0$. The constants $B_1$ and $B_2$ are, $$B_1 = A_3 + \tan\Psi\, A_2$$

$$B_2 = A_1 + 2\tan\Psi\, A_3 + \tan^2\Psi\, A_2 \quad (11)$$

and A are dimensionless constants, dependant only on the stiffness and shape of the curved segment, $$A_1 = \frac{1}{2L_h}\int_S \frac{I_h}{A_h L_h^2}\sin^2\phi + (1 - x/L_h)^2 \, ds \quad (12)$$

$$A_2 = \frac{1}{2L_h}\int_S \frac{I_h}{A_h L_h^2}\cos^2\phi + (y/L_h)^2 \, ds$$

$$A_3 = \frac{1}{2L_h}\int_S \frac{I_h}{A_h L_h^2}\cos\phi\sin\phi - (1 - x/L_h)(y/L_h) \, ds$$

In deriving Eq. (10) we have evaluated the integrals, $\int_S \cos\phi \, ds = 2L_h$, and $\int_S \sin\phi \, ds = 2y_0$, noting that $ds = dx/\cos\phi$ and $1/\cos\phi = \sqrt{1 + (dy/dx)^2}$.

The integrals in Eq. (12) must be evaluated numerically, however by selecting a form for $y(x)$ and series expanding the trigonometric functions to first order in $y_0$, approximate closed form expressions are obtained. For example, using Eq. (2) we obtain, $$A_1 \cong \frac{1}{3} + \frac{1}{2}\frac{I_h}{A_h L_h^2}\left(\frac{\pi}{2}\frac{y_0}{L_h}\right)^2 \quad (13)$$

$$A_2 \cong \frac{I_h}{A_h L_h^2} + \frac{1}{2}\left(\frac{y_0}{L_h}\right)^2$$

$$A_3 \cong \frac{y_o}{L_h}\left(\frac{I_h}{A_h L_h^2} - \left(\frac{2}{\pi}\right)^2\right)$$

FIG. 6 shows a comparison of the B constants based on the full integration, Eq. (12), with the approximate form (13). The approximate expressions are remarkably good for $y_0/L_h < 1$, and for small values of $I_h/A_h L_h^2$. The full numerically integrated forms have been used for all examples except where noted.

The total energy is simply $U = U_s + U_h$ and the unknown force and displacement are determined using Engesser's theorem, $$\frac{\partial U}{\partial F_c} = 0 \quad (14)$$

-continued $$\frac{\partial U}{\partial \tilde{F}_R} = 2u_R$$

After differentiating, the tangential force $\tilde{F}_R$ is set to zero resulting in a pair of linear equations in $u_R$ and $F_c$.

Noting that the effective thermal expansion is $$\bar{\alpha} = \varepsilon_t/\Delta T = \frac{u_R}{RC\Delta T} = \frac{u_R \cos\Psi}{L_h \Delta T} \quad (15)$$

and using the solution to Eq. (14), $$\bar{\alpha} = \alpha_h + (\alpha_s - \alpha_h)\Theta \quad (16)$$

where $\Theta$ is the relative effective thermal expansion, $$\Theta = B_1 \bigg/ \left(2\frac{E_h A_h}{E_s A_s}\frac{I_h}{A_h L_h^2} + \frac{B^2}{y_0/L_h + \tan\Psi}\right) \quad (17)$$

The force in the strut resulting from a temperature change is, $$\frac{F_C}{A_h E_h} = \frac{I_h}{A_h L_h^2}\frac{2(\alpha_s - \alpha_h)}{B_1}\Theta\Delta T \quad (18)$$

Equations (16 & 17), along with the definitions of the A,B constants from Equations (11 & 12), show that the effective thermal expansion, relative to the honeycomb material expansion, depends only on four non-dimensional quantities, that is $$\frac{\bar{\alpha}}{\alpha_h} = F\left\{\frac{\alpha_s}{\alpha_h}, \frac{E_s A_s}{E_h A_h}, \frac{I_h}{A_h L_h^2}, \frac{y(x)}{L_h}\right\} \quad (19)$$

If a form for $y(x)$ is selected, i.e. (2) or (3), then the dependency shown in Eq. (19) reduces to dependency on 4 constants.

It should be noted that the beam-theory analysis makes no assumption about the cross sectional shapes of the 'beams', however in the special case of a simple extrusion with out of plane depth z (see FIG. 1 for example), $$\frac{I_h}{A_h L_h^2} = \frac{1}{12}\left(\frac{t_h}{L_h}\right)^2 \text{ and } \frac{A_s}{A_h} = \frac{t_s}{t_h} \quad (20)$$

where $t_s$ and $t_h$ are the thicknesses of the strut and honeycomb elements. The dependency in Eq (19) hence reduces to, $$\frac{\bar{\alpha}}{\alpha_h} = F\left\{\frac{\alpha_s}{\alpha_h}, \frac{E_s}{E_h}\frac{t_s}{t_h}, \frac{t_h}{L_h}, \frac{y_0}{L_h}\right\} \quad (21)$$

i.e., there is no dependence on extrusion depth.

Further, it is clear that the 'strut' is a simple tension member, so that the analysis is valid for non-slender strut geometries, such as shown in FIG. 1, so long as there is only a relatively small load point at the connection with the bending element. In that case the quantity $E_sA_s$ is replaced by a generalized force-deflection response of the 'insert' part of the structure.

FIG. 7 shows the effective expansion calculated from Eq. (16) using $E_sA_s/E_hA_h=1$ and $I_h/A_hL_h^2=1/1200$ (corresponding to an extrusion with $t_h/L_h=0.1$), for various values of $\alpha_s/\alpha_h$. With these parameters specified, the amplitude of the curvature, $y_0$ (using form (2)), is varied to 'adjust' the effective expansion of the structure. For $y_0=0$ the effective expansivity is approximately (not exactly) that of the continuous honeycomb material. For $\alpha_s>\alpha_h$, increasing $y_0$ reduces $\bar{\alpha}$ until it becomes lower than either constituent, while for $\alpha_s<\alpha_h$, $\bar{\alpha}$ is greater than either constituent. For large $y_0$, ie. $y_0>\sim0.5$, there is a reversal in the trends, however the cell face curvature is so severe that this is most likely not a useful design regime. Note also that the curvature must not interfere with the next cell in the structure, therefore $y_0/L$ must be held to roughly less than 1 (the exact limit depends in particular design features such as the beam shape). When $\alpha_s$ is sufficiently large the effective expansion can be negative and the $\bar{\alpha}=0$, or zero expansion, values of $y_0$ are readily identified. The lowest $y_0$ root is probably of the most usefulness, a noted, due to the large curvature of the second root, and is denoted $y^*_0$. For completeness FIG. 7 extends to the range $y_0<0$, which is a design where the faces curve inward. The analysis here is valid for that case, however less significant expansion tailoring is achieved in that regime and so it will not be considered further.

Figure 8:
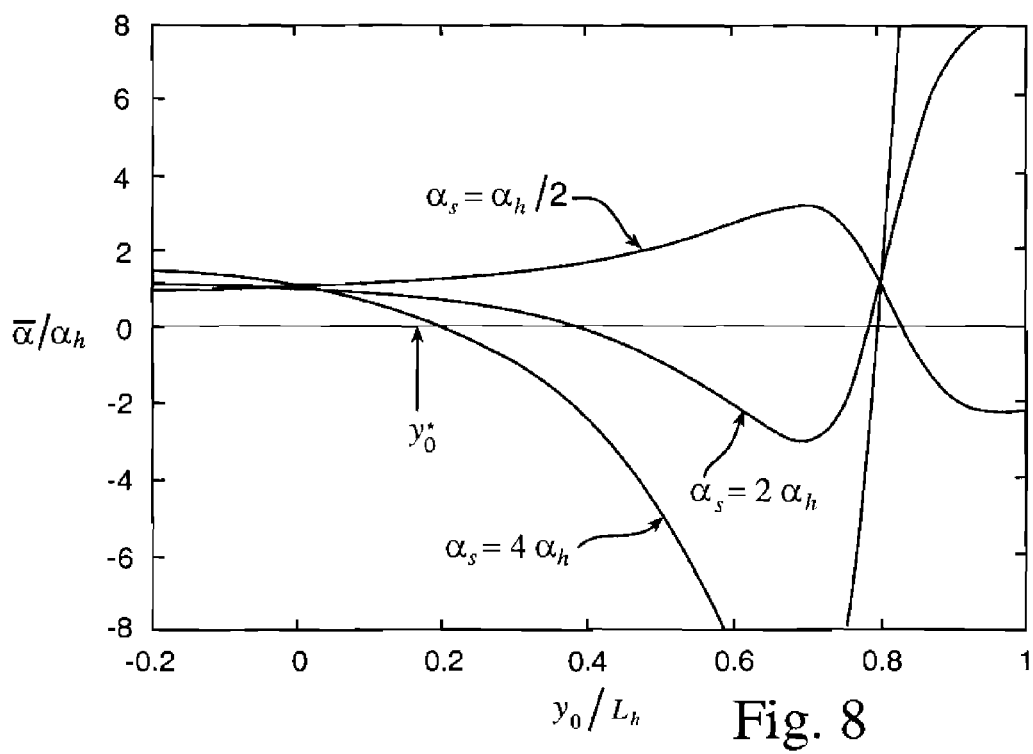
FIG. 8 is a graphical representation of the effective expansion of a tailorable four sided grid structure such as that shown in FIG. 3.

FIG. 8 shows the same results for a square configuration, i.e., $\Psi=\pi/4$ for $I_h/A_hL_h^2=1/1200$ and $E_sA_s=E_hA_h$. The square is somewhat less effective in the sense that greater curvatures must be introduced to achieve a desired expansivity. For this reason the square configuration will not be discussed in significant detail here, although the square geometry may prove superior in some applications when fabrication issues are taken into account.

Figure 9:
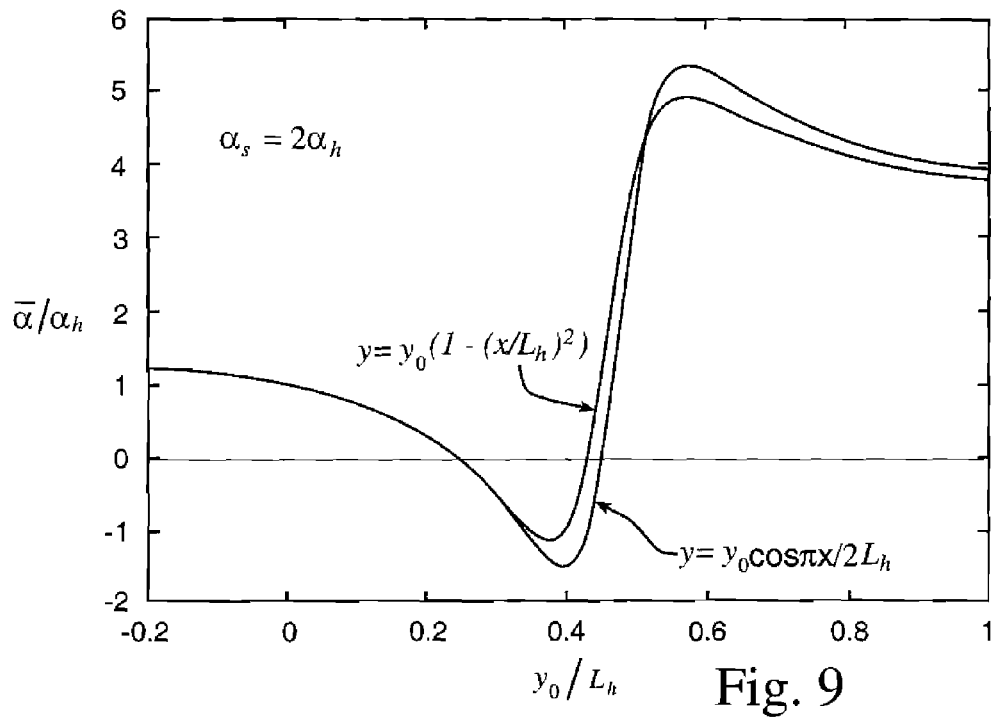
FIG. 9 as a graphical comparison of trigonometric and quadratic curvature forms.

As noted the effect of the particular choice of curvature function is minimal. FIG. 9 shows the difference between the forms (2) and (3) for $\alpha_s/\alpha_h=2$ and the other parameters as in FIG. 7. The effect of the specific shape is notably negligible in the region of interest (small $y_0$).

FIG. 9 is one example of a comparison of trigonometric and quadratic curvature forms with $I_h/A_hL_h^2=1/1200$, $E_sA_s=E_hA_h$ and $\alpha_s/\alpha_h=2$. For this reason the remainder of the discussion will utilize Eq (2), it is however an important point that for practical purposes the curvature need not follow a precise mathematical form.

Figure 10:
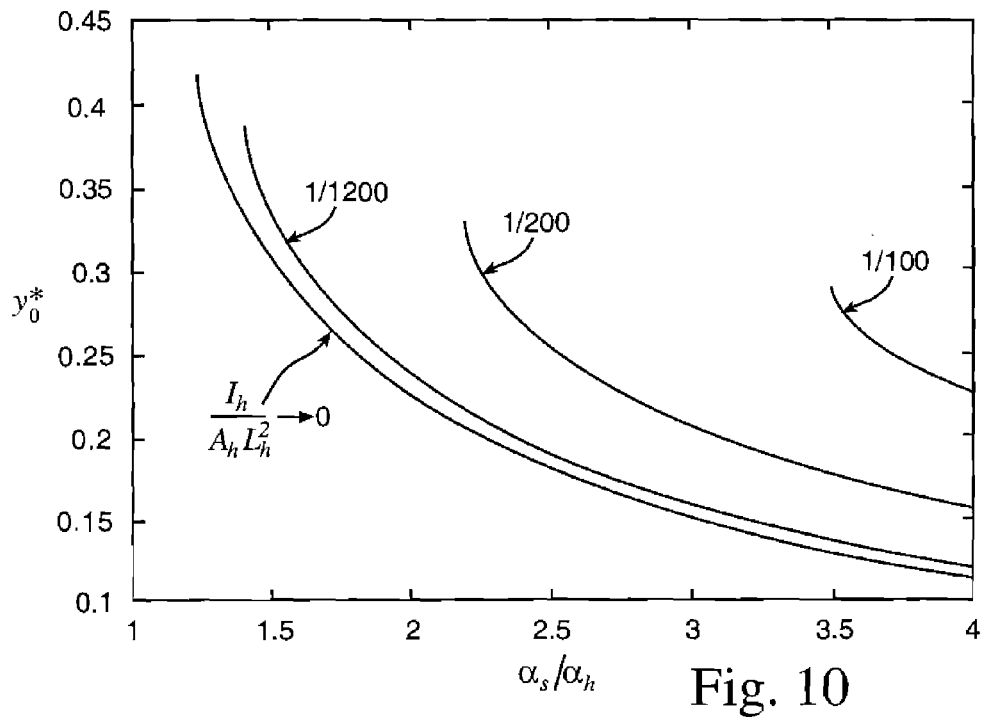
FIG. 10 is a graphical illustration of $y*_0$ for several values of $I_h/A_h L_h^2$ as $\alpha_s/\alpha_h$ is varied (with $E_s A_s = E_h A_h$).

In order to explore the range of useful values of the material and geometric parameters a numerical root finding algorithm was used to find $y^*_0$ (the first $\bar{\alpha}=0$ point). FIG. 10 shows $y^*_0$ for several values of $I_h/A_hL_h^2$ as $\alpha_s/\alpha_h$ is varied (with $E_sA_s=E_hA_h$). In the limit $I_h/A_hL_h^2 \to 0$ a zero expansion structure can be designed with only an approximately 20% difference in intrinsic constituent expansivity. Small values for the beam bending stiffness are undesirable as they result in low overall stiffness of the structure. Increasing $I_h/A_hL_h^2$ however, raises the minimum required CTE differential so that a compromise must be reached in the design process. It must be noted that for designs where a reduced, but non-zero, effective expansion is required greater flexibility in the choice of $\alpha_s/\alpha_h$ is available.

FIG. 10 is one graphical representation of the availability of zero CTE designs as a function of $\alpha_s/\alpha_h$ for selected $I_h/A_hL_h^2$, with $E_hA_h/E_sA_s=1$.

Figure 11:
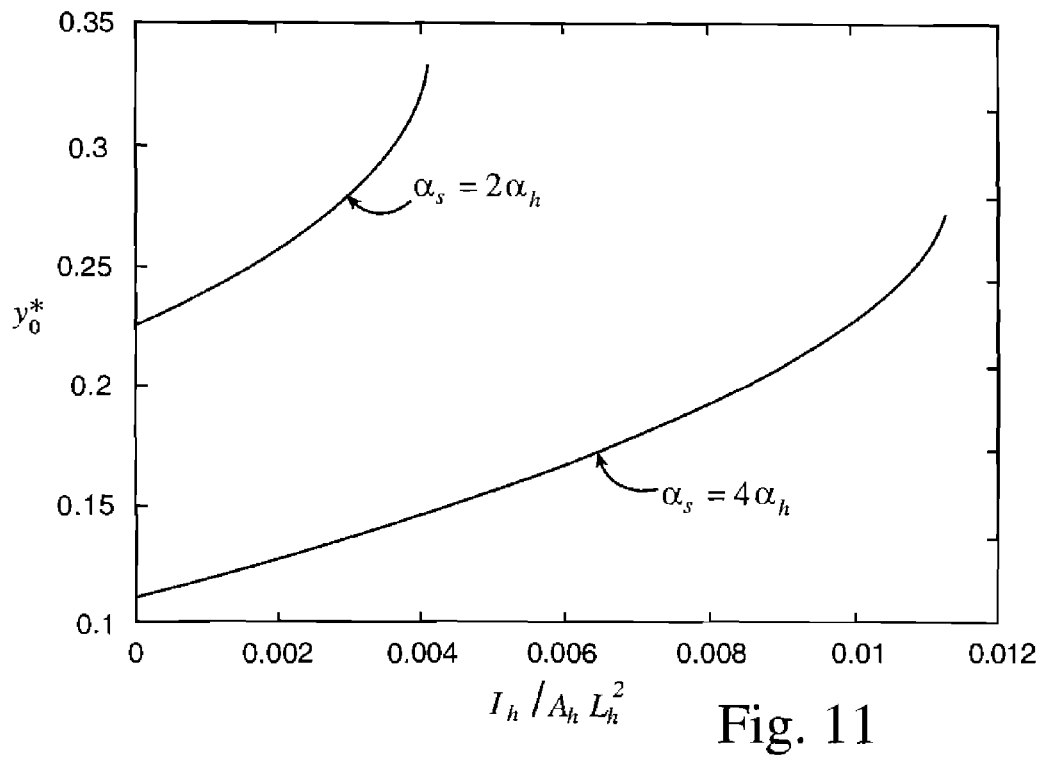
FIG. 11 graphically provides a visualization of the availability of zero coefficient of thermal expansion (CTE) designs as a function of honeycomb bending stiffness.

FIG. 11 graphically provides a visualization of the availability of zero CTE designs as a function of honeycomb bending stiffness. FIG. 11 shows $y^*_0$ for variations of the beam slenderness parameter ($I_h/A_hL_h^2$). For a zero expansion design to be achieved with $\alpha_s/\alpha_h=4$ the parameter is restricted to the range $0<I_h/A_hL_h^2<\sim0.011$. Lowering the CTE ratio requires lowering the beam bending stiffness. Typically, the upper values in the range are desirable for best mechanical stiffness, however, as will be shown the internal stressing in the structure increases with increasing $I_h/A_hL_h^2$ as well.

Figure 12:
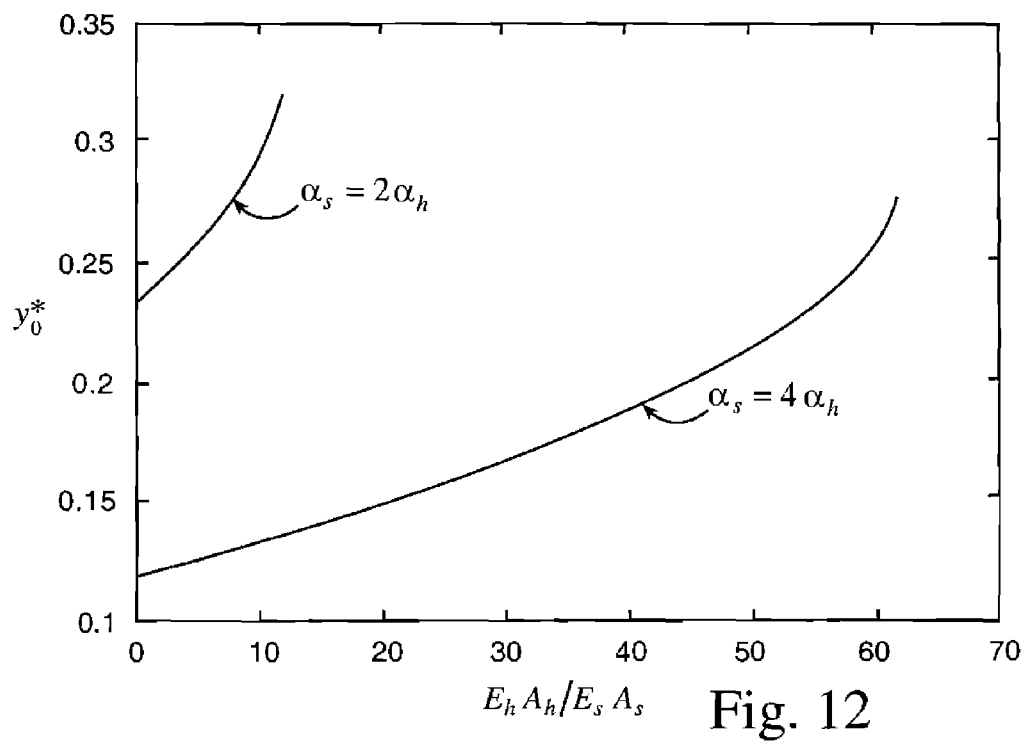
FIG. 12 graphically provides a visualization of the availability of zero CTE designs as a function of relative elastic stiffness with $I_h/A_h L_h^2 = 1/1200$.

FIG. 12 graphically provides a visualization of the availability of zero CTE designs as a function of relative elastic stiffness with $I_h/A_hL_h^2=1/1200$. FIG. 12 shows the trend in $y^*_0$ with $E_hA_h/E_sA_s$. It is useful to note that $E_hA_h/E_sA_s$ can be zero, e.g., the strut can be arbitrarily stiff compared to the bending element. This is important, as it permits use of more robust geometric forms such as shown in FIG. 1 rather that the thin struts shown in FIGS. 2 and 3.

Thus far the analysis has focused on the kinematics of the deformation. The internal stressing resulting from a temperature excursion will additionally be a design limiting issue. Prior to examining the stress issue, it should first be noted that the actual peak stress in the structure could (quite likely) be a result of the contact/interaction load between the strut and face elements. The analysis presented in this section is based strictly on the beam theory model. Implicitly, the interaction force between the strut and curved-face elements is evenly distributed over the cross section, that is, any local concentration is ignored. In the numerical simulation section we will show that it is possible to design smooth connection schemes that minimize such additional stressing.

The tangential stress in the curved beam, $\sigma$ is found by substituting Equation (6) into Equations (7) and (8), and using beam theory, $$\sigma = \frac{N}{A_h} + \frac{M\xi}{I_h} = \frac{F_C}{2A_h}\left((\tan\Psi\cos\phi + \sin\phi) + \frac{A_hL_h}{I_h}\frac{\xi}{L_h}(1-(|x|-\tan\Psi y)/L_h)\right) \quad (22)$$

where $\xi$ is the coordinate measured from the beam centroid. The quantity $A_hL_h^2/I_h$ is always large (no useful tailoring is achieved if it is small), and the second term is maximal at $x=0$ for typical $y(x)$ considered here. Hence the peak stresses (tensile and compressive) are, $$\sigma_{max} = \frac{N}{A_h} + \frac{M\xi}{I_h} = \frac{F_C}{2A_h}\left(\tan\Psi + \frac{A_hL_h}{I_h}\frac{\xi^\pm_{max}}{L_h}(1-\tan\Psi y_0/L_h)\right) \quad (23)$$

where $\xi_{max}^\pm$ represents the distance of the tensile and compressive surfaces from the beam centroid. The interaction force is found from Eq. (18) so that, $$\frac{\sigma_{max}}{E_h} = \left(\frac{I_h}{A_hL_h^2}\tan\Psi + \frac{\xi^\pm_{max}}{L_h}(1-\tan\Psi y_0/L_h)\right)\frac{(\alpha_s-\alpha_h)\Theta\Delta T}{B_1} \quad (24)$$

In the special case of an extruded section, using (20), $\xi_{max}^\pm = \pm t_h/2 = \pm L_h\sqrt{3I_h/A_hL_h^2}$ so that $$\frac{\sigma_{max}}{E_h} = \left(\frac{I_h}{A_hL_h^2}\tan\Psi \pm \left(\frac{3I_h}{A_hL_h^2}\right)^{1/2}\left(1-\frac{y_0}{L_h}\tan\Psi\right)\right)\frac{(\alpha_s-\alpha_h)\Theta\Delta T}{B_1} \quad (25)$$

Figure 13:
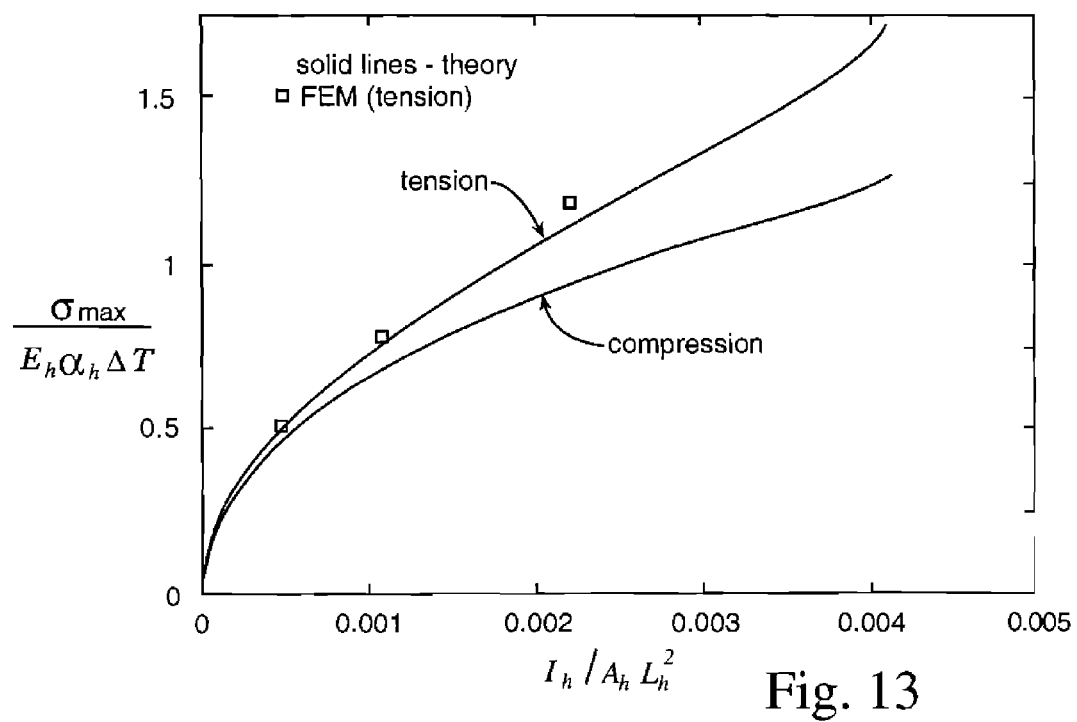
FIG. 13 graphically provides a visualization of bending stress for a zero expansion design.

FIG. 13 graphically provides a visualization of bending stress for a zero expansion design. These are beam theory predicted stresses and do not account for stress concentration effects at the strut-beam connection.

FIG. 13 shows the peak bending stressing in an extruded design with $E_h A_h/E_s A_s$ and $\alpha_s = 2\alpha_h$ as the beam bending stiffness is varied. As the bending parameter is varied, $y_0$ is also adjusted to the value required for zero expansion (which may be taken directly from FIG. 11). For concreteness of example if the beam is fabricated of titanium with, $\alpha_h \sim 8 \cdot 10^{-6}/°$ C., $E_h \sim 100$ GPa, and a design allowable strength of 400 MPa, and the required temperature excursion capability is 500° C., then the dimensionless stress parameter, $\sigma_{max}/E_h\alpha_h\Delta T$, must be held to less than unity.

The normalized stress parameter $\sigma_{max}/E\alpha\Delta T$ may be an important design limiting quantity. For example if a temperature excursion as large as 500° C. is to be tolerated then the parameter must be well less than one for most engineering materials to survive, hence a rather thin-faced honeycomb will be required. The 'thicker' end of the design space is however relevant for applications where lower temperature excursions are expected, where highly elastic materials can be utilized, or in case where only small adjustments to the intrinsic expansivity is needed.

To support the analytical predications a number of numerical simulations were performed. The simulations were designed to address a number of key issues: 1) confirmation of the basic analysis without making beam-theory assumptions; 2) evaluation of the design performance using a finite rather than infinitely periodic grid; 3) evaluation of performance under symmetry-breaking conditions such as non-uniform temperature distributions and uniaxial stiffness index calculation; 4) consideration of large deformations; and 5) consideration of stress concentration effects, and of the effect of finite-size contact on the thermal expansion prediction.

To address these points, the tailorable design concept was further explored using three separate numerical simulations: 1) a 2D continuum model of the periodic unit cell; 2) a 3D solid continuum model and 3) a 3D beam-element model. The unit cell model provides the most accurate comparison with the analytical results, while the other models are useful for visualizing the geometry and demonstrating the behavior of bounded (i.e. not infinitely periodic) structures.

Figure 14:
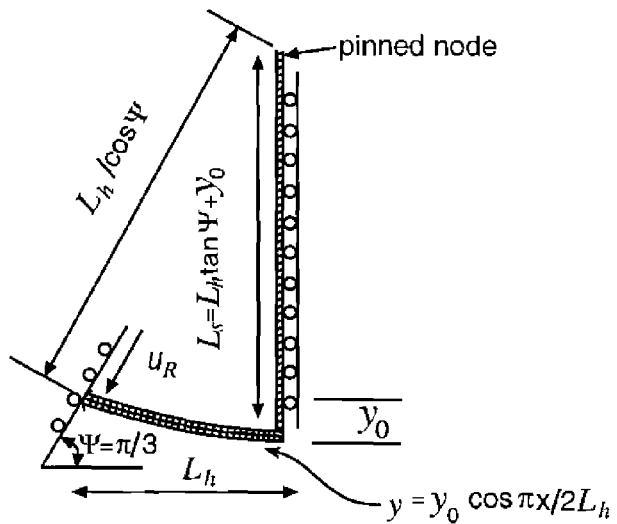
FIG. 14 shows one embodiment of a periodic ABAQUS finite element simulation using the unit cell geometry.

FIG. 14 is a periodic finite element model. An ABAQUS finite element simulation was preformed using the unit cell geometry as shown in FIG. 14. This is a true minimal unit cell, i.e., half of the geometry utilized for the analytic calculations. Reduced integration elements were used for best accuracy in the bending elements and a non-linear geometry static equilibrium analysis (NLGEOM) was performed. The materials were specified as linear elastic with equal Young's modulus and Poisson's ratio. The honeycomb expansivity was fixed at 2 ppm/° C. while the expansivity of the strut and the initial face curvature parameter $y_0$ were varied. The model was subjected to a uniform temperature change and the effective expansion determined from the displacement of the single node at R relative to the fixed center point C.

Figure 15:
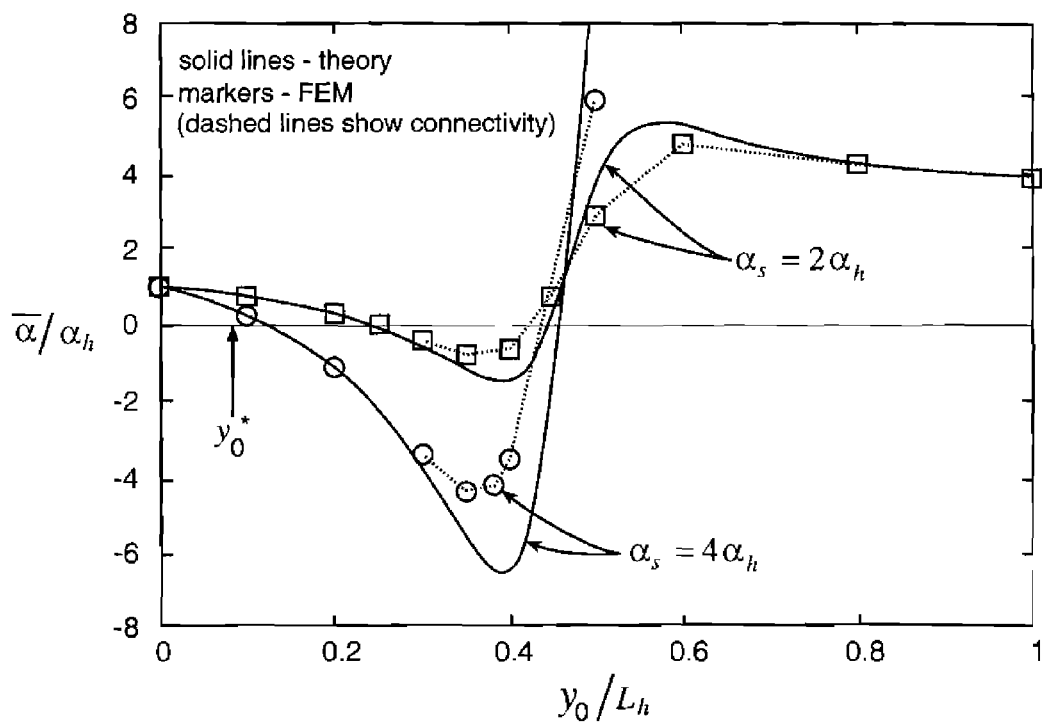
FIG. 15 shows a graphical representation of variations of effective thermal strain with intrinsic CTE ratio and cell face curvature based upon theoretical and modeling results.

The effective linear expansivity is derived from the displacement resulting from a 10° C. temperature change and is shown on FIG. 15. The agreement with the analytical prediction is remarkably good. Notably the agreement is nearly exact close to the important first $\bar{\alpha}=0$ point. For larger $y_0$ there is some disagreement, which is not unexpected due to the approximate nature of the Timoshenko beam solution method. Nonetheless even for $y_0 \sim 1$ here is a qualitative agreement in the prediction of an amplified expansion ($\bar{\alpha}$ greater than either constituent).

FIG. 15 shows a graphical representation of variations of effective thermal strain with intrinsic CTE ratio and cell face curvature. FIG. 15 provides a graphical comparison of analytic model prediction with unit cell finite element model.

Figure 16:
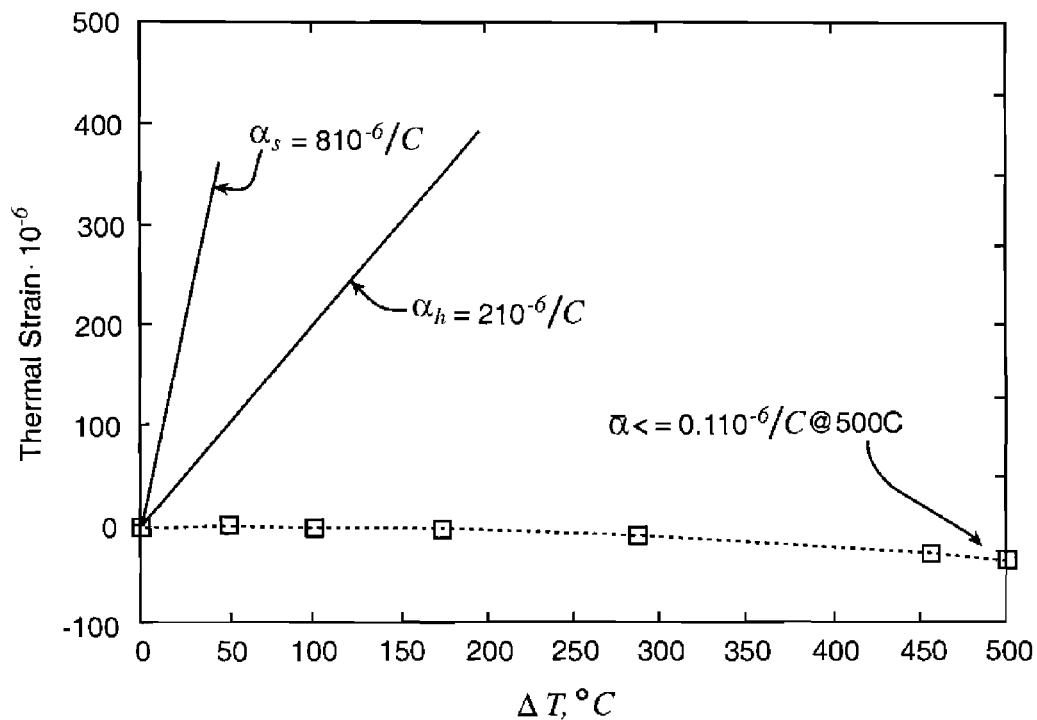
FIG. 16 is a graphical representation of thermal strain versus temperature change for a finite element prediction of nonlinear thermal strain over large temperature excursion.

The finite element solution, further, permits analysis of the nonlinear nature of the expansion behavior due to large temperature excursions. FIG. 16 shows the thermal strain of a structure designed for "0 CTE" at room temperature. The strain is nearly zero over 50-100° C. and becomes slightly negative for increasing temperature. This can be understood qualitatively as the bending due to the thermal strains effectively, incrementally, increases the value of $y_0$. Indeed it would be straightforward to iteratively account for the progressive shape change following the analytical procedure, however, that exercise has not been perused.

FIG. 16 is a graphical representation of thermal strain versus temperature change for a finite element prediction of nonlinear thermal strain over large temperature excursion. Solid lines show linear expansion of homogeneous constituents for reference. Dashed line connects numerically derived data points.

It follows then that a structure with zero effective CTE at some particular target temperature could be designed by suitable adjustment of the initial $y_0$ value.

Relying solely on the periodic unit cell calculation(s) leaves a number of open issues. Any real structure will be bounded, hence subject to edge effects. Also, realistically, temperature distributions may be far from uniform, so that it is important to verify that the essential behavior is not dependant on mathematically precise symmetry. Indeed it is useful to check the correctness of the basic symmetry assumptions which are shared by the analytic model and the unit cell finite element model. Finally it is useful for conceptualization purposes to develop three dimensional models to consider some potentially useful deviations from the simple extruded 2D geometry as well as to begin considering fabrication issues.

Figure 17:
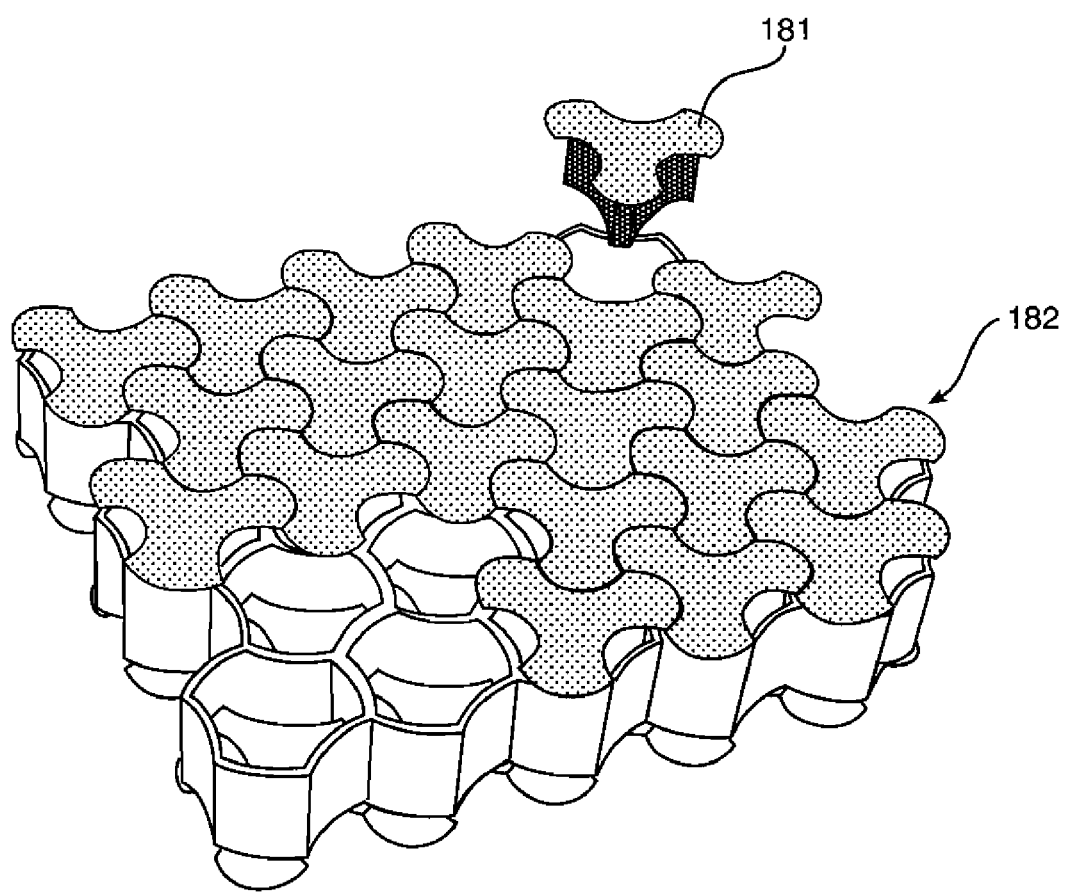
FIG. 17 is an illustrative example of a thermally stable structure with a near continuous surface.

FIG. 17 is an illustration of a three-dimensional (3D) continuum finite element model of the tailorable expansion concept. The 3D model is a complete discretization of a finite number of cells 185 (a total of 25 cells depicted), and is generated programmatically so that the geometric parameters ($y_0$, $t_h$, etc) can be readily specified. The 3D model proved to be essential for visualization purposes, as well as to explore a number of non-planar variations on the concept.

As an example, in FIG. 17, the 'strut' parts are fabricated to be somewhat taller than the honeycomb and have faces that overlap the top/bottom of the honeycomb so as to form a nearly continuous surface with only small expansion gaps. This type of design, of course, does not exactly follow the analytical predictions, however with guidance from the predictions, tailored CTE designs can be produced with some minimal iteration of parameters.

The 3D model demonstrates clearly that the concept does work well for a finite number of cells. Whenever there are free edges, the cells near the edges expand generally according to their constituent material expansivities, however it was found that for a structure as small as 16 cells (4×4) all of the cells away from the edges show the expected tailored effective expansion behavior, to a good approximation. Edge cells locally expand positively. The concept does require some extent of the grid structure and will not work at all with, for example, a single unit cell. Of course, for a real application a large number of cells should be used so that the edge effects can be neglected, but it is useful to know that a demonstration model could be devised with a fairly small number.

Figure 18A:
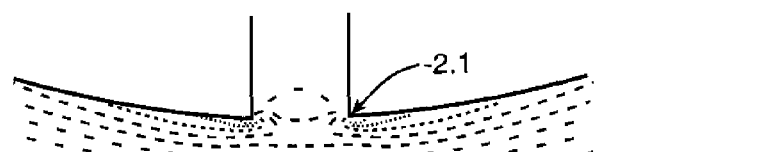
FIG. 18a shows an illustration of contour plots of the bending (x-component) stress derived from the 3D continuum model using same-modulus materials perfectly bonded at the interface.
Figure 18B:
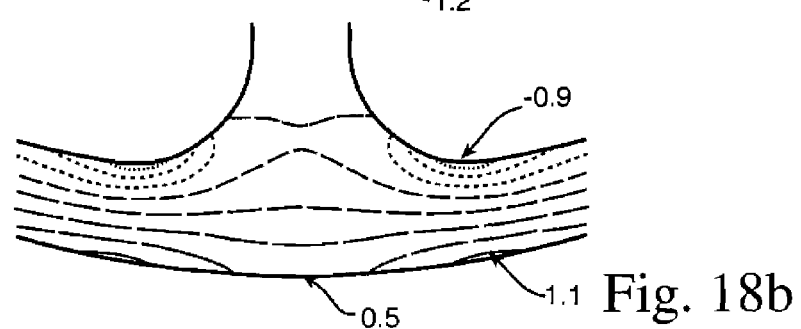
FIG. 18b shows an illustration of one embodiment of stress concentration mitigation by filleting the corner.

FIG. 18*a* shows an illustration of contour plots of the bending (x-component) stress derived from the 3D continuum model using same-modulus materials perfectly bonded at the interface. The peak tension occurs, as predicted, at the center of the honeycomb faces and is slightly higher than the beam theory prediction (Eq. 25) of $\sigma_{max}=1.115 E\alpha\Delta T$. The stress at the sharp corner on the compressive side of the beam is roughly twice the predicted value however. FIG. 18b shows an illustration of one embodiment of stress concentration mitigation by filleting the corner. In this example the peak stressing is brought to be approximately equal to the beam theory prediction. Another effective approach is to round the strut end so a Hertz-contact joint is formed. It should be noted that these changes do impact the effective thermal expansion behavior so that a final design procedure will require some adjustment of the curvature ($y_0$), based on simulation and/or experiment, to compensate for the effect of connection details such as fillet radius.

The utility of the continuum model for analysis for analysis of structures with a large number of cells is limited by the scale of the computation. The 25 cell model has, for example, more than 40,000 elements. Extending this model to even larger numbers of cells would require a prohibitive amount of computing time. Further, when the global behavior of large structures consisting of beam-like elements is examined, such a discrete solid model is not the most accurate computational approach in any case.

Figure 19:
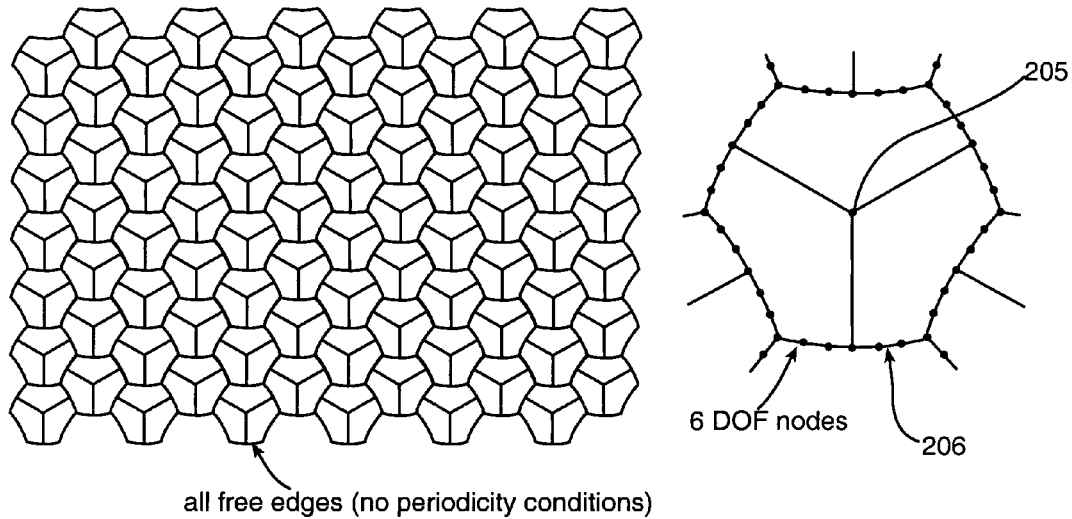
FIG. 19 shows an illustration of a beam-element based finite element model.

For these reasons a third finite element model was developed. FIG. 19 shows an illustration of a beam-element based finite element model. Each strut is discretised as a single element 20S, and each face by approximately 6 to 10 elements 206. The ABAQUS 3D beam elements allow arbitrary specification of the section properties (I,A) directly. It should be noted, however, that the graphic representation of them, unfortunately, does not properly reflect their 'thickness' dimensions, i.e. the beam element method can properly model such geometrically complex designs such as shown in FIG. 17, but one must be aware that the figures can give a misleading impression of a 'wire frame'-like model.

Figure 20:
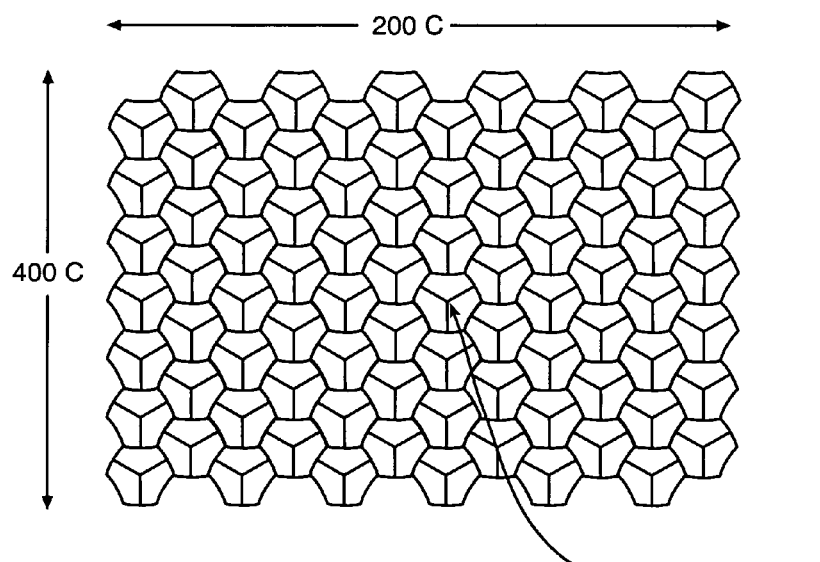
FIG. 20 shows an arbitrary temperature distribution found by applying different temperature boundaries to different parts of the mathematical model.

The beam element model readily and rapidly calculates the deformation of solids with many hundreds of cells. The thermal expansion of the structure resulting from a uniform temperature change again follows the analytic predictions. With this model however, symmetry breaking loading can be examined, as for example due to a non-uniform in-plane temperature distribution. FIG. 20 shows an arbitrary temperature distribution found by applying different temperature boundaries to different parts of the model (the constituent thermal conductivity must be specified and is taken to be uniform). With temperatures of 200° C. and 400° C. applied along two edges, and the others insulated, the mean temperature, $\overline{\Delta T}$ is found from the steady state heat transfer solution as approximately 280° C.

With such a non-uniform temperature distribution one would expect a structure to both expand and distort. In order to evaluate the behavior of the thermally stable design we characterize the distribution of thermal expansion by calculating displacement of each node in the grid relative to a central reference node, as indicated on the figure. The local effective thermal strain is defined as $\epsilon_t(r)=u_r/r$, with r the distance between the node and the reference node and $u_r$ the magnitude of the relative displacement.

FIG. 20 is an illustration of an arbitrary non-uniform temperature distribution. Effective thermal strain may be measured based on displacement relative to the indicated reference node.

Figure 21:
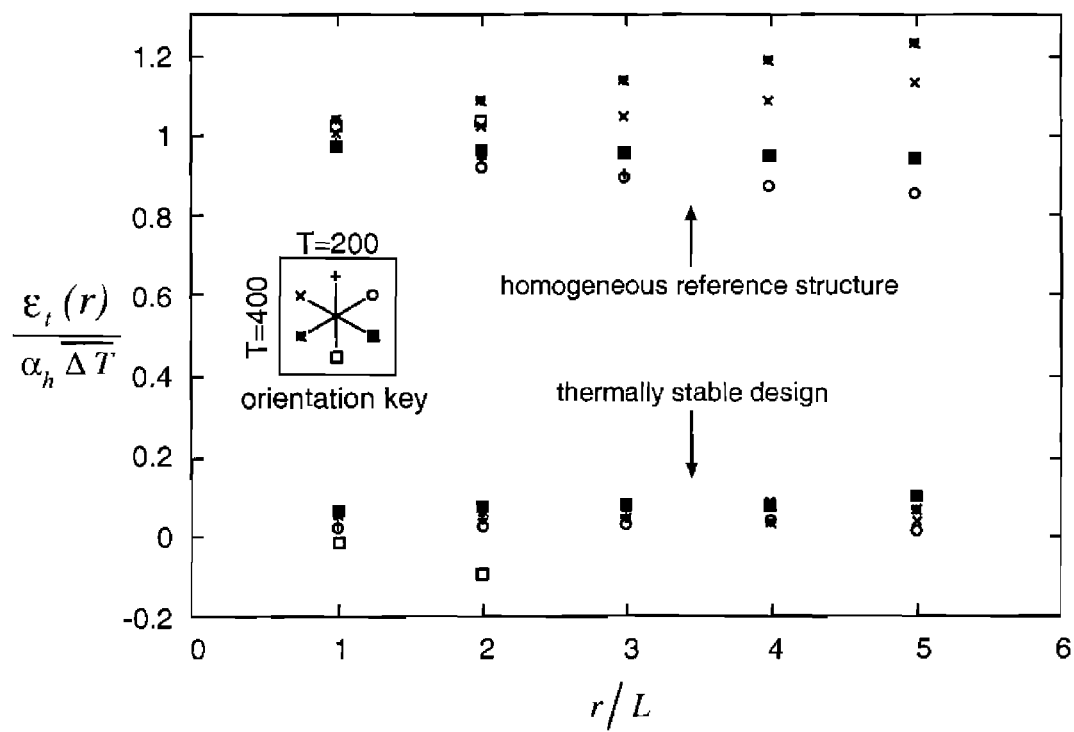
FIG. 21 shows the distribution of thermal expansion, normalized by the expected average expansion of a homogeneous structure.

The analysis was performed for a structure designed for zero expansion under uniform temperature change. For comparison the analysis was repeated for the same structure with a homogeneous material specified, that is the struts are the same material as the honeycomb. FIG. 21 shows the distribution of thermal expansion, normalized by the expected average expansion of a homogeneous structure at the mean temperature change, and measured in various directions relative to the reference node. The homogeneous structure expounds and distorts as expected, while the expansion of the stable structure is an order of magnitude lower and nearly uniform. The furthest outlying points are notable edge effects.

This is an important result, as the original calculations relied on the symmetry of a uniform temperature change; it is valuable to know that the essential character of the behavior is maintained even with a substantial asymmetry.

FIG. 21 is an illustration of distortion due to in-plane thermal gradient depicted in FIG. 20. The homogeneous reference structure expands and distorts while the expansion of the thermally stable structure is an order of magnitude lower.

A composite material/structural design concept has been devised to allow fabrication of structures with tailored or designed-in CTE values. The usefulness if the concept is significantly enhanced by an accurate analytic method for specifying the relevant materials and structural parameters to achieve a desired expansion characteristic.

The two constituent materials can be simply held together by compression and friction, so that substantially different materials can be utilized (e.g., a metal honeycomb might be combined with a high expansion polymer).

The tailored CTE design achieves its expansion characteristics by deliberately introducing compliant bending members. As such the overall stiffness of the structure is substantially sacrificed in comparison to a similar weight truss designed for stiffness rather that CTE. For this reason, the most promising applications appear to be where the structural loads are small, such as mirror platforms. In such applications it may be preferable to have the CTE of the structure in one plane (e.g., the plane of the mirror) about 0.0.

For the present invention, the coefficient of thermal expansion of the structure is preferably less than the first material coefficient of thermal expansion and less than the second material coefficient of thermal expansion for temperature changes of more than 500° C., more preferably for temperature changes of more than 20° C., and most preferably at any temperature change.

Tailorable design is modeled by idealizing the structure as a consisting of two-dimensional beam-like components, and analyzing the response of a unit cell, as shown in FIG. 2. The insert portion of the model cell behaves simply as a one-dimensional column in compression and the deformation of the honeycomb face is calculated following the analysis of a structural arch. The effective thermal strain, $\overline{\epsilon}_t$ resulting from a temperature change T, may be determined by combining Equations 16, 17 and 11, resulting in:

$$\overline{\epsilon}_t = \alpha_h T + (\alpha_s - \alpha_h)T\left(1 - (2A_{12} + \tan\psi A_{22}) \right. \tag{26}$$

$$\left. \frac{(2A_{12} + \tan\psi A_{22})}{2\frac{E_h}{E_s}\frac{A_h}{A_s}\frac{I_h}{A_h L_h^2} - \frac{Lh}{Ls}(2A_{11} + 4A_{12}\tan\psi + \tan^2\psi A_{22})}\right)$$

Where $\alpha_h$ and $\alpha_s$ are the expansion coefficients of the honeycomb material (h) and strut material (s). Referring back to FIG. 1, this would be the honeycomb structure 11 and the insert 12 respectively. $E_h$, $A_h$, $I_h$, and $L_h$, are the elastic modulus, cross section area, section modulus and length of the honeycomb cell side $L_h$ in FIG. 2.

The corresponding s-subscripted values refer to the strut material. The constants $A_{11}$, $A_{12}$ and $A_{22}$ are readily calculated functions of the honeycomb section material properties and structural shape. The fixed interior angle $\psi$ of a hexagonal unit cell as shown in FIG. 1 is $\pi/3$.

Equation (19) shows that the effective thermal expansion relative to the honeycomb material CTE depends only on four non-dimensional parameters.

Where $y_0$ (which appears in the $A_{ij}$) is the amplitude of the curvature of the honeycomb faces, $y_0$ is an important control parameter that may be adjusted to produce the desired expansion behavior.

FIG. 15 shows the effective expansion calculated using the unit cell analysis, along with the results of a finite element simulation of a full honeycomb array for verification purpose. Once such a plot is constructed for reasonable values of the thermal, elastic and geometric quantities the value of $y_0$ that results in zero thermal expansion is readily found as the zero-crossing on the plot. Further, the range of possible expansivity is seen to range, in the example with $\alpha_s/\alpha_h=4$, from $-4\bar{\alpha}_h T$ to $8\bar{\alpha}_h T$.

Near-zero expansion structures are fabricated using engineering materials with large expansion coefficients. The structures are shown to exhibit near-zero thermal expansion over a wider range of temperature than available low-CTE materials and further allow expansion-critical design using materials which are desirable for other reasons such as cost, weight, ultimate temperature capability and environmental resistance. The general methodology further permits design of structures with specific non-zero shape change characteristics such as contracting or negative expansion structures or structures with larger expansion than the constituents where desirable. The design is superior to earlier composite structure designs in being isotropic and lacking pivot joints.

The basic invention design can further be used to create structures with graded thermal expansion properties simply be grading the design parameters (i.e. $y_0$). Such structures can be used to join two other structures with different thermal expansion characteristics with different matching properties at each junction. In one embodiment the coefficient of thermal expansion of the overall structure may be less than the first material coefficient of thermal expansion and the second material coefficient of thermal expansion. This approach can provide consistent surface area with respect to the flat orientation.

The design concept and the analysis method leading to expression (26) are also valid for square rather than hexagonal grid geometry. A square geometry may serve to simplify fabrication depending on the specific application. It should also be noted that although the essential analysis is done for a 2-d 'extrusion' configuration, significant variations in the geometry can be incorporated without changing the thermal deformation character. As an example, FIG. 17 shows a concept for a near continuous surface 182 achieved by adding face plates to the individual struts. The plates may be designed so that there are 'expansion' gaps between a faceplate 181 that may be designed to close under a thermal load.

The present invention has numerous specific applications. One application specifically envisioned is foldable and deployable space satellite mirrors. Other applications include rocket nozzles and jet engine nozzles.

While specific embodiments have been described in detail in the foregoing description and illustrated in the drawings, those with ordinary skill in the art may appreciate that various modifications to the details provided could be developed in light of the overall teachings of the disclosure.

What is claimed is:

1. A thermally stable structure comprising:
   a contiguous structure including a plurality of cell sides intersecting at a plurality of corners forming a plurality of cells, the contiguous structure consisting of a first material having a coefficient of thermal expansion greater than zero; and
   at least one insert located in a cell of the plurality of cells, the insert consisting of a second material having a second coefficient of thermal expansion greater than zero and different than the coefficient of thermal expansion of the first material, the insert oriented to connect to the cell sides of the plurality of cell sides forming the cell of the plurality of cells between corners of the plurality of corners corresponding to segments;
   wherein the plurality of cell sides bend as the first and second materials expand,
   wherein the at least one insert is in compression as the first and second materials expand,
   wherein the plurality of corners rotate as the first and second materials expand, and
   wherein the two materials structurally combined result in a coefficient of thermal expansion of the thermally stable structure less than the first material coefficient of thermal expansion and less than the second material coefficient of thermal expansion.

2. The structure of claim 1 wherein the coefficient of thermal expansion of the structure in at least one plane is about 0.0.

3. The structure of claim 1 wherein the second material is an overlapping insert that forms a nearly continuous surface.

4. The structure of claim 1 wherein the two materials are structurally combined to form a plurality of hexagonal unit cells with curved sides.

5. The structure of claim 1 wherein bending of the first material off sets thermal expansion of the second material.

6. The structure of claim 1, wherein the coefficient of thermal expansion of the thermally stable structure remains less than the first material coefficient of thermal expansion and less than the second material coefficient of thermal expansion through about a 500° temperature excursion.

7. A thermally stable structure comprising:
   a first material having a coefficient of thermal expansion greater than zero;
   a second material having a second coefficient of thermal expansion greater than zero and different than the coefficient of thermal expansion of the first material; and
   the first material forming a contiguous honeycomb structure having a plurality of honeycomb sides connecting at a plurality of corners and a top surface; and
   the second material forming a plurality of inserts which contact at least two honeycomb sides,
   wherein the honeycomb sides of the plurality of honeycomb sides bend as the first and second materials expand,
   wherein the inserts of the plurality of inserts are in compression as the first and second materials expand,
   wherein the plurality of corners rotate as the first and second materials expand, and
   wherein the coefficient of thermal expansion of the structure is less than the first material coefficient of thermal expansion and less than the second material coefficient of thermal expansion.

8. The structure of claim 7 wherein the inserts overlap at least a portion of the top surface.

9. The structure of claim 8 wherein at least some of the inserts overlap at least a portion of other inserts.

10. The structure of claim 9 wherein inserts overlap at least a portion of other inserts to form a near continuous surface.

11. The structure of claim 7 wherein the coefficient of thermal expansion of the structure in at least one plane is about 0.0.

12. The structure of claim 7, wherein the coefficient of thermal expansion of the structure remains less than the first material coefficient of thermal expansion and less than the second material coefficient of thermal expansion through about a 500° temperature excursion.

13. A thermally stable structure comprising:
   a first material having a coefficient of thermal expansion greater than zero; and
   a second material having a coefficient of thermal expansion greater than zero and not equal to the coefficient of thermal expansion of the first material;
   the first material structurally configured in a contiguous plurality of repetitive four-sided elements having four corners, each element of the plurality of elements bisected by an insert composed of the second material;
   wherein the sides of the plurality of repetitive four-sided elements bend as the first and second materials expand,
   wherein the inserts bisecting the plurality of elements are in compression as the first and second materials expand,
   wherein the corners of the plurality of elements rotate as the first and second materials expand, and
   wherein the coefficient of thermal expansion of the structure is less than the first material coefficient of thermal expansion and less than the second material coefficient of thermal expansion.

14. The structure of claim 13, wherein the coefficient of thermal expansion of the structure remains less than the first material coefficient of thermal expansion and less than the second material coefficient of thermal expansion through about a 500° temperature excursion.

* * * * *